(12) United States Patent  (10) Patent No.: US 7,883,150 B2
Grenier  (45) Date of Patent: Feb. 8, 2011

(54) PORTABLE NECK AND HEAD SUPPORT WITH STRAP FOR HOLDING DURING USE AND STORAGE

(76) Inventor: Laura D. Grenier, 75 Chickering Rd., Spencer, MA (US) 01562

( * ) Notice: Subject to any disclaimer, the term of this patent is extended or adjusted under 35 U.S.C. 154(b) by 0 days.

(21) Appl. No.: 12/322,636

(22) Filed: Feb. 5, 2009

(65) Prior Publication Data

US 2010/0194166 A1  Aug. 5, 2010

(51) Int. Cl.
A47C 7/38 (2006.01)
(52) U.S. Cl. .................. 297/393; 297/392; 297/397
(58) Field of Classification Search ............. 297/392, 297/393, 397
See application file for complete search history.

(56) References Cited

U.S. PATENT DOCUMENTS

| | | | | |
|---|---|---|---|---|
| 2,908,766 A * | 10/1959 | Taylor | ............. | 297/391 X |
| 3,578,383 A * | 5/1971 | Earl | ............. | 297/391 |
| 4,165,125 A * | 8/1979 | Owen | ............. | 297/397 X |
| 4,206,945 A * | 6/1980 | Kifferstein | ............. | 297/397 X |
| 4,274,673 A * | 6/1981 | Kifferstein | ............. | 297/391 X |
| 4,440,443 A * | 4/1984 | Nordskog | ............. | 297/397 |
| 4,550,458 A * | 11/1985 | Fiore | ............. | 297/393 X |
| 4,679,263 A * | 7/1987 | Honer | ............. | 297/393 X |
| 4,726,085 A * | 2/1988 | Antonio | ............. | 297/393 X |
| 5,313,678 A * | 5/1994 | Redewill | ............. | 297/393 X |
| 5,330,255 A * | 7/1994 | Stawicki | ............. | 297/397 X |
| 5,501,508 A * | 3/1996 | Llewellyn | ............. | 297/397 |
| 5,567,015 A * | 10/1996 | Arias | ............. | 297/397 |
| 5,975,638 A * | 11/1999 | Schreiner | ............. | 297/392 X |
| 6,216,298 B1 * | 4/2001 | Oliveira | ............. | 297/393 X |
| 6,386,639 B1 * | 5/2002 | McMichael | ............. | 297/393 X |
| 6,523,901 B2 * | 2/2003 | Smith | ............. | 297/392 |
| 6,793,287 B2 * | 9/2004 | Dunk | ............. | 297/397 |
| 6,860,563 B1 * | 3/2005 | Semsch et al. | ............. | 297/397 |
| 7,665,804 B1 * | 2/2010 | Jeffrey | ............. | 297/220 |
| 2002/0043859 A1 * | 4/2002 | Smith | ............. | 297/392 |
| 2003/0127899 A1 * | 7/2003 | Smith | ............. | 297/397 |
| 2005/0173962 A1 * | 8/2005 | Stein et al. | ............. | 297/397 |
| 2007/0180623 A1 * | 8/2007 | Stein et al. | ............. | 297/397 X |

* cited by examiner

Primary Examiner—Rodney B White
(74) Attorney, Agent, or Firm—James F. Baird

(57) ABSTRACT

A portable and self storing head and neck support having a horseshoe shaped portion filled with batting material attached at the top to a rectangular shaped portion having closed sides and a continuous open interior resulting in an open end opposite the point of attachment to the horseshoe shaped portion with an internal strap secured at the closed sides said strap incorporating an elastic member.

1 Claim, 5 Drawing Sheets

US 7,883,150 B2

PORTABLE NECK AND HEAD SUPPORT WITH STRAP FOR HOLDING DURING USE AND STORAGE

FIELD OF INVENTION

The present invention relates generally to Neck and Head Supports used at home, during travel and elsewhere. The Support is portable and easily stored when not in use.

BACKGROUND

The invention relates to the area of back and neck supports for use when seated in a chair or seat. The invention may be used at home, in a plane, in a train, in a bus or elsewhere.

There are several head supports that have been produced over the years. Some require the use of stiff fillers to provide support. Some make use of air or some fluid to provide support. The prior art that makes use of air requires that the air be evacuated in order to fold and store the support when not in use. The prior art that incorporates some form of fluid for support are either not capable of being folded for storage or risk leakage when folded or possibly even when in use. In the event of such a leak the support becomes useless. Usually the fluid filled supports must be stored in a full sized configuration. This same problem is encountered when a stiff filler is used to provide support.

The result is that the supports, that utilize liquid or still fillers, take up unnecessary space when not in use. Therefore the supports, that are not capable of easy storage, are not likely to be used when one travels. Even the air filled supports are not user friendly in that they must be blown up for use, possibly requiring a pump or a lot of lung pressure on behalf of the user. Even preparing the air filled supports for storage is time consuming, and possibly annoying to those around the user. The air filled support run the risk of a puncture resulting in loss of air. In the event of such a loss of air the support becomes useless The present invention makes use of materials that are soft and comfortable when in use and flexible in order that the support is easily folded for storage. In addition the present invention provides a strap to secure the support to the seat or chair being occupied. The present invention also incorporates a self storage feature where a portion of the support forms into a storage bag. The storage bag portion of the support receives the remainder of the support with the strap, that is provided to secure the support to a seat or chair, acting to hold the support in a stored position and further providing a carrying handle.

The present invention provides an improved neck and head support that incorporates a soft filler, is portable, easily stored and has a strap that may be used to secure the support when in use or act as a carrying handle when not is use.

An object of the invention is to furnish a neck and head support that is portable.

A further object of the invention is to furnish a neck and head support that incorporates a filler that is soft and easily folded for storage.

Another object of the invention is to a strap that may be used to secure the neck and head support when in use and also be used as a handle for carrying the support when not in use.

SUMMARY OF THE INVENTION

The present invention is a neck and head support pillow which can cradle the head and neck with a strap incorporating elastic to secure it to most backrests. It keeps your neck comfortable while in a high-back seat in an upright position. It also can be used without attaching the elastic strap on motionless seats. The support is an apparatus to enable you to support your head while at home, traveling, dozing or feeding a baby. The head support can be used in the car without interfering with the seat belt. It also promotes proper positioning instead of lying down in the car, which is dangerous. It also can be used on a plane to ensure proper support and a barrier between you and germs. Quite often there are no pillows or blankets available. Even when they are available it is questionable as to how clean, or sanitary, they are. The smell of the pillows and infrequently washed blankets that are available don't compare to the smell of home. The elastic strap support also can be used on a train or bus which have similar high back seats. The head support can also be used as a bolster behind the lumbar spine while driving. It supports the lower back where the seat leaves off and the bolster takes over. The head support can be used while breast or bottle feeding baby to ensure neck support during frequent feedings. No one wants a crick in the neck from looking down during the entire feeding. This enables you to straighten out the neck and give it some support. The head support can be used upside down like a u-shape with a small blanket to cover the upper body for those chilly trips when no blanket is available. It can also be used during long movies at the theater. Although the support is considered safe it is not recommended for use by children under five without adult supervision to insure proper use. The head support is easily stored for travel. The elastic strap acts to form a compact bundle, and may be used as a carrying handle. The outer material helps keep the support free from germs. It can be machine washed and dried flat to insure shape.

The present invention makes use of materials that are soft and comfortable when in use and flexible in order that the support is easily folded for storage. In addition the present invention provides a strap to secure the support to the seat or chair being occupied. The present invention also incorporates a self storage feature where the support folds inside out and forms into a storage bag. The storage bag feature of the support receives the remainder of the support. When the support is folded inside out the strap, that is provided to secure the support to a seat or chair, acts to hold the support in a stored position and further provides a carrying handle.

The present invention provides an improved neck and head support that incorporates a soft filler, is portable, easily stored and has a strap that may be used to secure the support when in use or act as a carrying handle when not is use.

An object of the invention is to furnish a neck and head support that is portable.

A further object of the invention is to furnish a neck and head support that incorporates a filler that is soft and easily folded for storage.

Another object of the invention is to a strap that may be used to secure the neck and head support when in use and also be used as a handle for carrying the support when not in use.

BRIEF DESCRIPTION OF THE DRAWINGS

Turning first to FIG. 1a there is shown a side view of the present invention, PORTABLE NECK AND HEAD SUPPORT WITH STRAP FOR HOLDING DURING USE AND STORAGE. The person and seat shown in dotted lines are not a part of the invention and are shown for illustrative purposes only. Please note that the invention is shown being used as a support for the person's head and neck at the Rectangular Area 8 and continues being positioned behind the person. The combined Rectangular Shaped Strap 17 and Piece Of Elastic 23 are shown in dotted lines as they are within the Rectangular Shaped Flexible Sheet 9 holding the Invention to the backrest portion of the seat.

Next turning to FIG. 1b there is shown a side view of the present invention, PORTABLE NECK AND-HEAD SUPPORT WITH STRAP FOR HOLDING DURING USE AND STORAGE. The person and seat shown in dotted lines are not a part of the invention and are shown for illustrative purposes only. Please note that the invention is shown being used as a support for the person's neck and head at the Rectangular Area 8 and continues being positioned over the person's shoulders and chest. The combined Rectangular Shaped Strap 17 and Piece Of Elastic 23 are shown in dotted lines as they are within the Rectangular Shaped Flexible Sheet 9 holding the Invention to the backrest portion of the seat.

As shown each Flexible Sheet 1 is in a horseshoe shape. Each Flexible Sheet 1 having Shaped Edges 7. Each Flexible Sheet 1 has a Rectangular Area 8.

Figure 3:
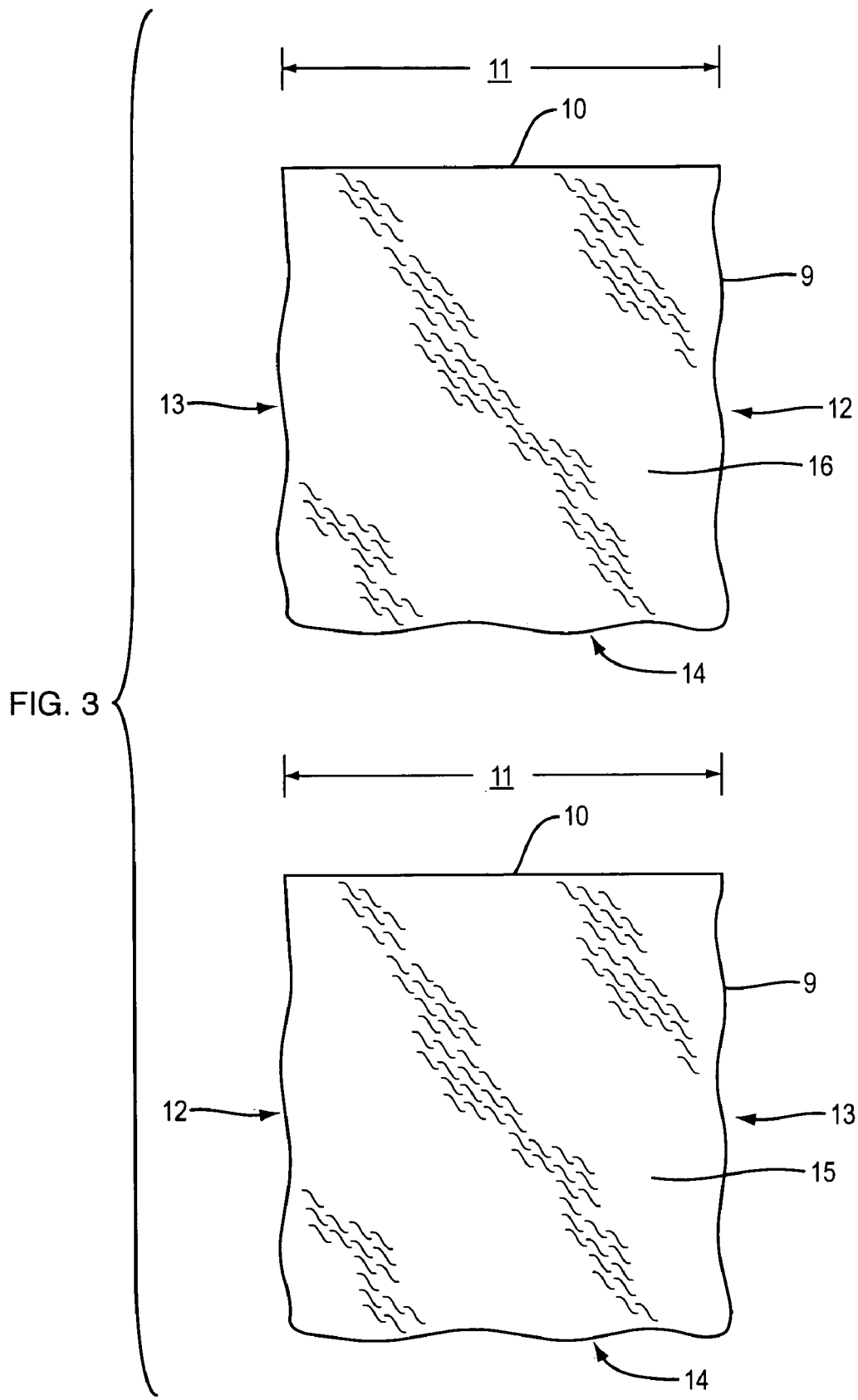

FIG. 3 shows a plan view of a pair of Rectangular Shaped Flexible Sheets 9. Each Rectangular Shaped Flexible Sheet 9 having Top Edge 10. Each Top Edge having Width Dimension 11, Right Side Edge 12, Left Side Edge 13, Bottom Edge 14, Inside Surface 15 and Outside Surface 16.

Figure 4:
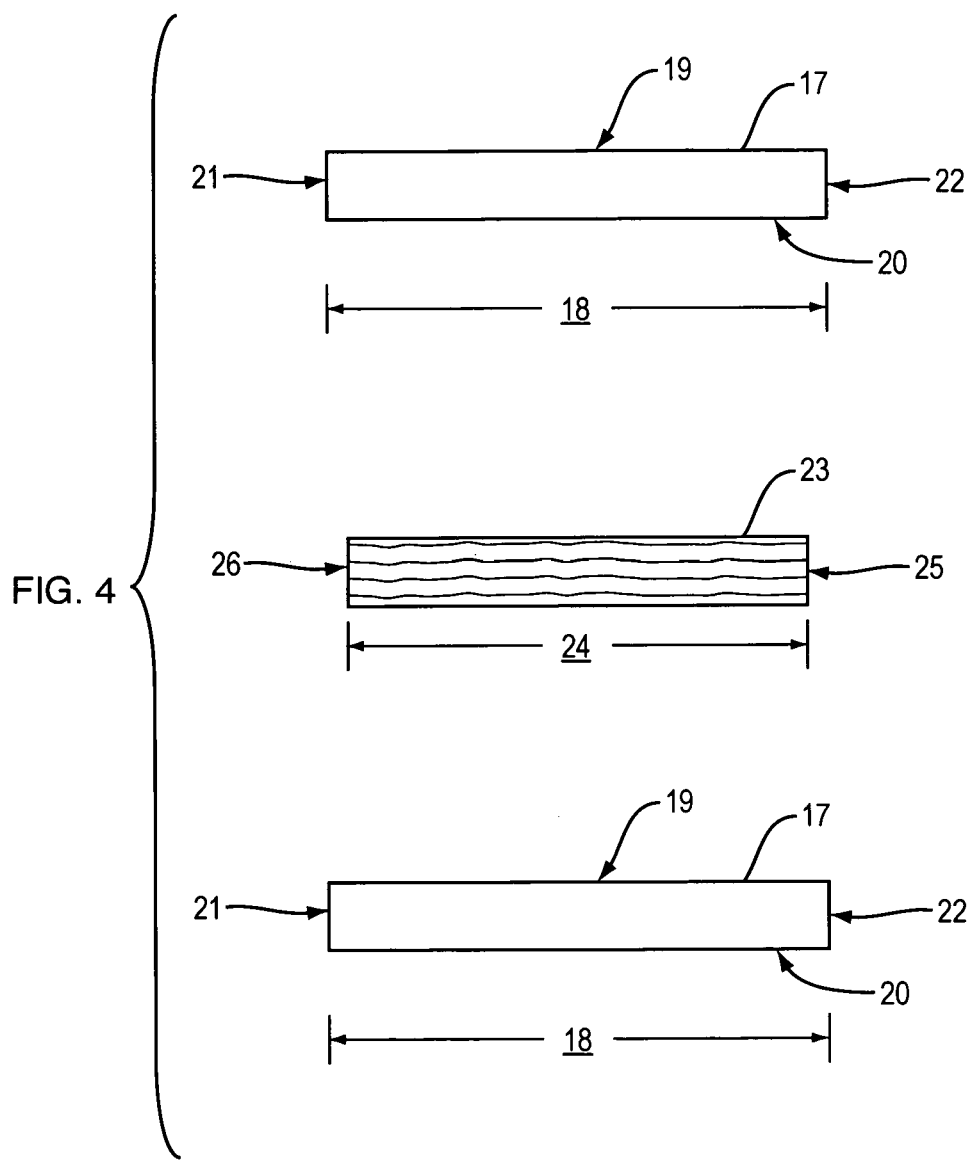

FIG. 4 shows a plan view of a pair of Rectangular Shaped Straps 17. Each Rectangular Shaped Strap 17 having Length Dimension 18, First Length Edge 19, Second Length Edge 20, First Width Edge 21 and Second Width Edge 22.

In addition FIG. 4 shows a plan view of a Piece Of Elastic 23. The Piece Of Elastic 23 having a Length Dimension 24, a First End 25 and Second End 26.

The Width Dimension 3, Width Dimension 11 and Length Dimension 18 are all equal. The Length Dimension 24 is less than 3, 11 or 18.

There is no Batting shown in the drawings as it would be a standard off the shelf item, readily available in the market.

DESCRIPTION OF THE PREFERRED EMBODIMENT

Figure 1A:
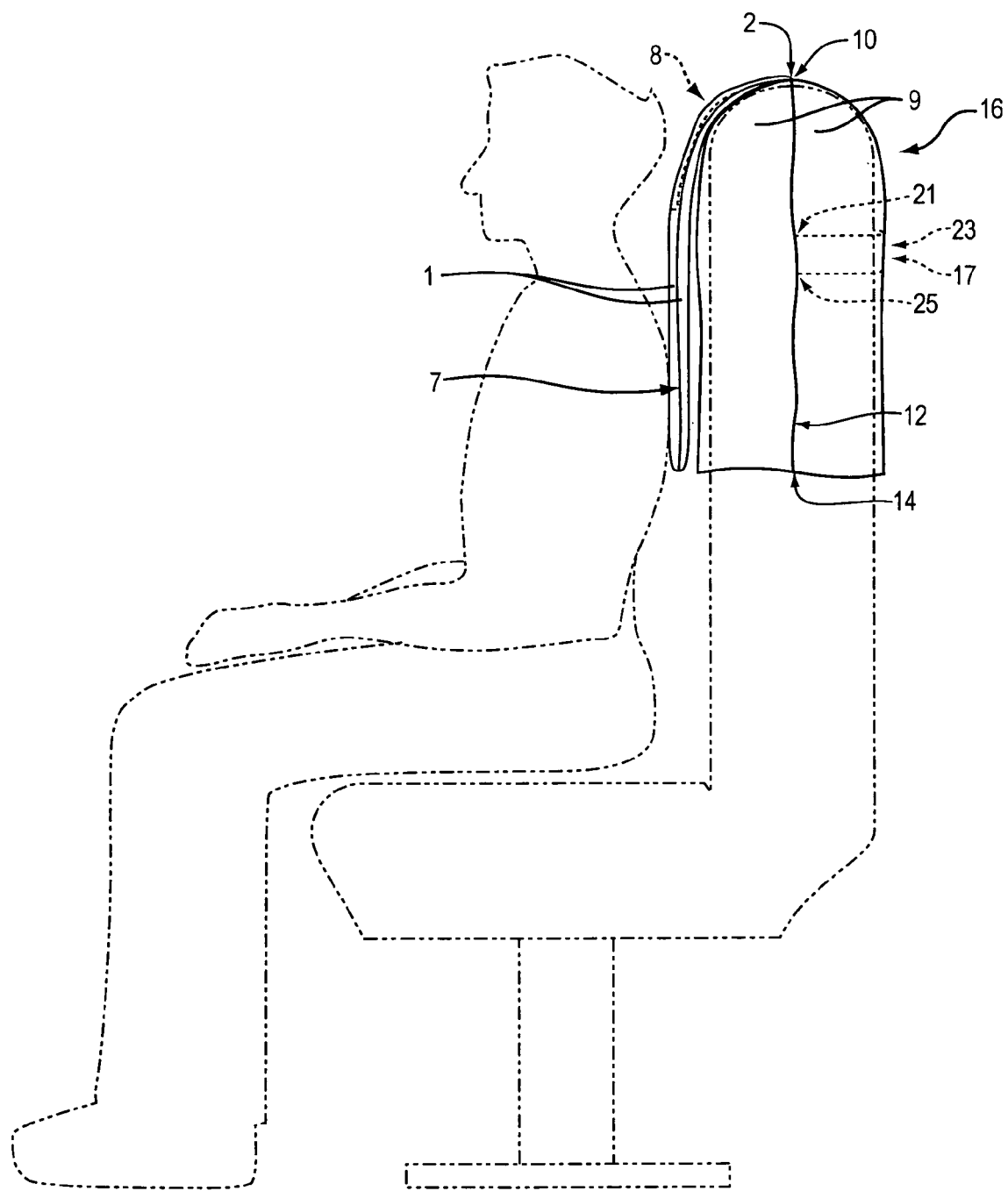
Figure 1B:
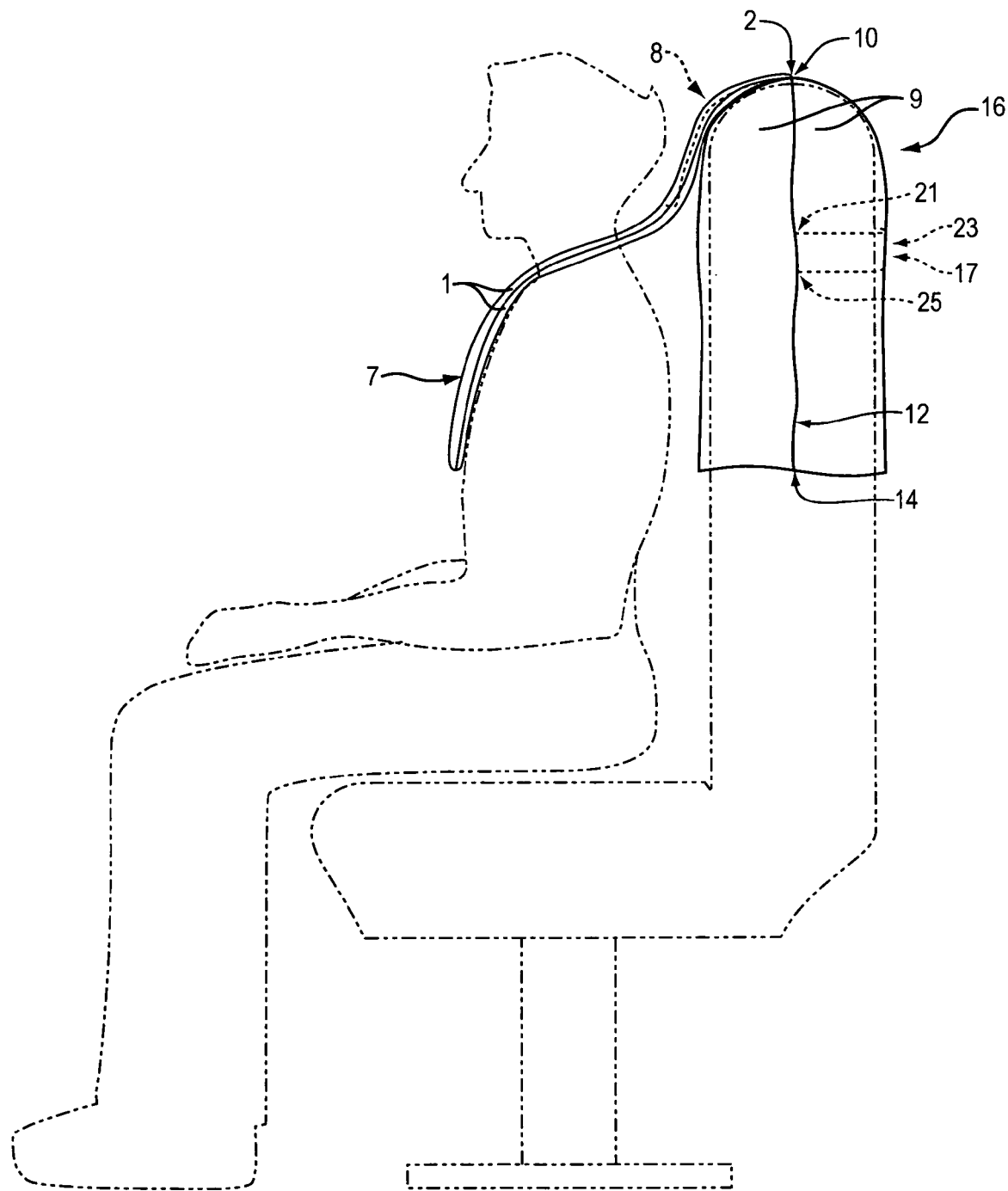

Referring now to the drawings and the illustrative embodiments depicted therein, a Portable Neck And Head Support With Strap For Holding During Use And Storage, in accordance with the present invention, is shown in FIG. 1.

The present invention is a neck and head support pillow which can cradle the head and neck with a strap incorporating elastic to secure it to most backrests. It keeps your neck comfortable while in a high-back seat in an upright position. It also can be used without attaching the elastic strap on motionless seats. The support is an apparatus to enable you to support your head while at home, traveling, dozing or feeding a baby. The head support can be used in the car without interfering with the seat belt. It also promotes proper positioning instead of lying down in the car, which is dangerous. It also can be used on a plane to ensure proper support and a barrier between you and germs. The elastic strap support also can be used on a train or bus which have similar high back seats. The head support can also be used as a bolster behind the lumbar spine while driving. It supports the lower back where the seat leaves off and the bolster takes over. The head support can be used while breast or bottle feeding baby to ensure neck support during frequent feedings. The head support can be used upside down like a u-shape with a small blanket to cover the upper body for those chilly trips when no blanket is available. It can also be used during long movies at the theater. The head support is easily stored for travel. The elastic strap acts to form a compact bundle, and may be used as a carrying handle.

The present invention makes use of materials that are soft and comfortable when in use and flexible in order that the support is easily folded for storage. In addition the present invention provides a strap to secure the support to the seat or chair being occupied. The present invention also incorporates a self storage feature where the support folds inside out and forms into a storage bag. The storage bag feature of the support receives the remainder of the support. When the support is folded inside out the strap, that is provided to secure the support to a seat or chair, acts to hold the support in a stored position and further provides a carrying handle.

The present invention provides an improved neck and head support that incorporates a soft filler, is portable, easily stored and has a strap that may be used to secure the support when in use or act as a carrying handle when not is use.

Now with reference to the drawings: A Portable Neck And Head Support With Strap For Holding During Use And Storage is shown in FIG. 1.

Figure 2:
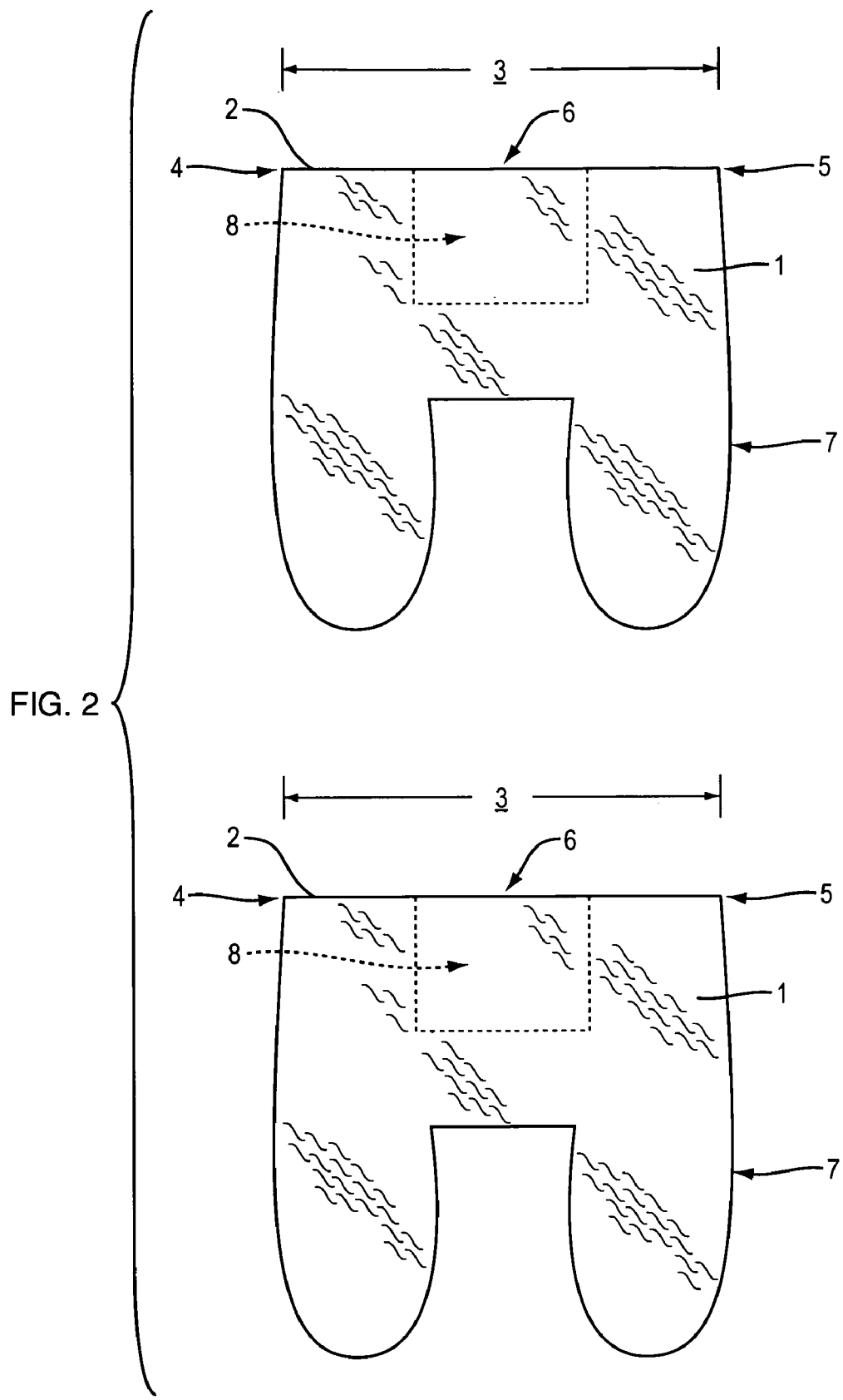
FIG. 2 shows a plan view of a pair of Flexible Sheets 1. Each sheet having a Straight Top Edge 2. Each Straight Top Edge having Width Dimension 3, First End 4, Second End 5 and Middle Section 6.

The Support is filled with a quantity of batting material from the group that includes cotton, polyester and wool. A pair of Flexible Sheets 1 are shown in FIG. 2. The flexible sheets are made of a material such as cotton or fleece. As shown the flexible sheets are shaped in the form of a horseshoe and are mirror images of each other. The Flexible Sheets 1 each have a Straight Top Edge 2. The Flexible Sheets Straight Top Edges have a Width Dimension 3, a First End 4, a Second End 5 and a Middle Section 6. Note that the Flexible Sheets have Shaped Edges 7 that form the shape of a horseshoe. The Flexible Sheets 1 Shaped Edges are fixedly secured to one another forming a horseshoe shaped pocket; with a sufficient quantity of said batting material being placed in said horseshoe shaped pocket to produce a desired thickness. The thickness may vary depending on the use or individuals preferences. The Top Edges 2 of said flexible sheets being fixedly secured to one another in order to retain the batting material. The batting material situated within the Rectangular Area 8 of the Flexible Sheets located at the Middle Section 6 is adjusted as to quantity and resultant thickness to form either a slight depression or a slight mound depending on the preference and the use. The Straight Top Edges 2 being sewn together to form an area that retains the desired portion of the batting and prevents the portion of the batting from shifting.

A pair of Rectangular Shaped Flexible Sheets 9 are shown in FIG. 3. The sheets are also made of material from the group that includes cotton and fleece. The Rectangular Shaped Flexible Sheets each have a Top Edge 10, The Top Edges have a Width Dimension 11. The Top Edge Width Dimension 11 is the same as the Width Dimension 3 of the Flexible Sheets 1. In addition the Rectangular Shaped Flexible Sheets 9 each have a Right Side Edge 12, a Left Side Edge 13, a Bottom Edge 14, an Inside Surface 15 and an Outside Surface 16. The pair of Rectangular Shaped Flexible Sheets 9 are fixedly secured to each other at the Top Edges 10, the Right Side Edges 12 and the Left Side Edges 13, with the Inside Surfaces 15 facing each other.

A pair of Rectangular Shaped Straps 17 are shown in FIG. 4. The Rectangular Shaped Straps are also made of flexible sheets of material from the group that includes cotton and fleece. The Rectangular Shaped Straps 17 each have a Length Dimension 18 that is the same as the Width Dimension 11 of the Rectangular Shaped Flexible Sheets 9. In addition each Strap has a First Length Edge 19, a Second Length Edge 20, a First Width Edge 21 and a Second Width Edge 22. The First Length Edges are fixedly secured to each other, the Second Length Edges also are fixedly secured to each other, the result forms a tunnel the Length Dimension 18 of the Rectangular Shaped Straps.

FIG. 4 also shows a Piece Of Elastic 23. The Elastic having a Length Dimension 24 that is less than the Length Dimension 18 of the Straps. In addition the Length Dimension 24 of the Elastic is less than the Width Dimension 11 of the Rectangular Shaped Flexible Sheets 9. In addition the Piece Of Elastic has a First End 25 and a Second End 26. The Piece Of Elastic 23 is inserted thru the tunnel formed by the Rectangular Shaped Straps, said First End 25 of the Elastic is fixedly secured to the First Width Edge 21 of the Rectangular Shaped Straps, the Second End 26 of the Elastic is fixedly secured to the Second Width Edge 22 of the Rectangular Shaped Straps. The combined First End of the Elastic and First Width Edges of the Rectangular Shaped Straps are fixedly secured to the Inside Surface 15 at the Right Side Edge 12 of the Rectangular Shaped Flexible Sheets. The combined Second End of the Elastic and Second Width Edges of the Rectangular Shaped Straps are fixedly secured to the Inside Surface 15 at the Left Side Edge 13 of the Rectangular Shaped Flexible Sheets.

The Rectangular Shaped Flexible Sheets 9 Top Edge 10 Outside Surface 16 is fixedly secured to the Flexible Sheets 1 Straight Top Edge 2.

As discussed this may be accomplished in several embodiments of the present invention.

From the foregoing description it will be apparent that changes and modifications can be made to the apparatus without departing from the teaching of the present invention. Accordingly, it is distinctly understood that the invention is not limited to the preferred embodiment but may be embodied and practiced within the scope of the following claims.

I claim the following:

1. A self storing, portable head and neck support comprising:
    a. a quantity of batting material from the group that includes cotton, polyester and wool;
    b. a pair of flexible sheets of material from the group that includes cotton and fleece, said flexible sheets being shaped in the form of a horseshoe and being mirror images of each other, said flexible sheets having straight top edges; said flexible sheets straight top edges having a width dimension, a first end, a second end and a middle section; said flexible sheets further having shaped edges that form the shape of a horseshoe; said flexible sheets shaped edges being fixedly secured to one another forming a horseshoe shaped pocket; a sufficient quantity of said batting being placed in said horseshoe shaped pocket to produce a desired thickness; said straight top edges of said flexible sheets being fixedly secured to one another in order to retain the batting material; a rectangular area of said flexible sheets at the middle section of said straight top edges being sewn together to form an area that retains a portion of said batting and prevents said portion from shifting;
    c. a pair of rectangular shaped flexible sheets of material from the group that includes cotton and fleece; said rectangular shaped flexible sheets each having a top edge with a width dimension that is the same as the width dimension of the flexible sheets, a right side edge, a left side edge, a bottom edge, an inside surface and an outside surface; said pair of rectangular shaped flexible sheets being fixedly secured to each other at the top edges, the right side edges and the left side edges, with the inside surfaces facing each other, said rectangular shaped sheets, when combined, being in a first position forming a cavity that may be entered at the bottom edge;
    d. a piece of elastic material having a length dimension that is less than the width dimension of said flexible sheets, a first end and a second end;
    e. a pair of rectangular shaped straps made of flexible sheets of material from the group that includes cotton and fleece, said rectangular shaped straps each having a length dimension that is the same as the width dimension of said flexible sheets, a first length edge, a second length edge, a first width edge and a second width edge, said first length edges being fixedly secured to each other, said second length edges being fixedly secured to each other, forming a tunnel the length of the rectangular shaped straps;
    f. said elastic material being inserted thru the tunnel formed by the rectangular shaped straps, said first end of the elastic material being fixedly secured to the first width edge of said rectangular shaped straps; said second end of the elastic material being fixedly secured to the second width edge of the rectangular shaped straps, said combined first end of the elastic material and first width edges of said rectangular shaped straps being fixedly secured to the inside surface at the right side edge of the rectangular shaped flexible sheets, said combined second end of the elastic material and second width edges of said rectangular shaped straps being fixedly secured to the inside surface at the left side edge of the rectangular shaped flexible sheets, and
    g. said rectangular shaped flexible sheets top edge outside surface being fixedly secured to the flexible sheets straight top edge said rectangular shaped flexible sheets when turned inside out, starting at the cavity bottom edge, being in a second position forming a carrying case.

* * * * *